United States Patent
Li et al.

(10) Patent No.: US 12,185,159 B2
(45) Date of Patent: *Dec. 31, 2024

(54) METHOD AND APPARATUS FOR TRANSMITTING DATA AND COMMUNICATION SYSTEM

(71) Applicant: FUJITSU LIMITED, Kawasaki (JP)

(72) Inventors: Guorong Li, Beijing (CN); Pengyu Ji, Beijing (CN); Xin Wang, Beijing (CN); Lei Zhang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/203,796

(22) Filed: May 31, 2023

(65) Prior Publication Data
US 2023/0308936 A1  Sep. 28, 2023

Related U.S. Application Data

(63) Continuation of application No. 17/173,136, filed on Feb. 10, 2021, now Pat. No. 11,700,543, which is a
(Continued)

(51) Int. Cl.
*H04W 28/02* (2009.01)
*H04W 4/40* (2018.01)
*H04W 80/02* (2009.01)

(52) U.S. Cl.
CPC ......... *H04W 28/0268* (2013.01); *H04W 4/40* (2018.02); *H04W 28/0263* (2013.01); *H04W 28/0278* (2013.01); *H04W 80/02* (2013.01)

(58) Field of Classification Search
CPC .............. H04W 28/0268; H04W 4/40; H04W 28/0263; H04W 28/0278; H04W 80/02;
(Continued)

(56) References Cited

U.S. PATENT DOCUMENTS

2015/0156743 A1  6/2015  Lee et al.
2016/0219132 A1  7/2016  Lee et al.
(Continued)

FOREIGN PATENT DOCUMENTS

CN  104811892 A  7/2015
CN  106961704 A  7/2017
(Continued)

OTHER PUBLICATIONS

International Search Report and Written Opinion of the International Searching Authority issued by the State Intellectual Property Office of the P. R. China for corresponding International Patent Application No. PCT/CN2018/107410, mailed on Jun. 24, 2019, with an English translation.
(Continued)

*Primary Examiner* — Sudesh M Patidar
(74) *Attorney, Agent, or Firm* — Myers Wolin, LLC

(57) ABSTRACT

An apparatus and method for transmitting data of vehicle communication (V2X) services and a communication system. The apparatus includes: a first generating unit configured in a media access control (MAC) layer of the terminal equipment and configured to generate at least one protocol data unit (PDU) in a mode identical to a transmission mode to which a service data unit (SDU) contained in a PDU corresponds; and a first transmitting unit configured in the MAC layer and configured to transmit the PDU to a physical layer of the terminal equipment, and notify the transmission mode to which the PDU corresponds to the physical layer. This disclosure facilitates the physical layer to transmit data in a corresponding transmission mode. The terminal equipment may determine the transmission mode or set the transmission mode according to the indication information, and layers of the terminal equipment perform corresponding processing.

10 Claims, 7 Drawing Sheets

Related U.S. Application Data continuation of application No. PCT/CN2018/107410, filed on Sep. 25, 2018.

(58) Field of Classification Search
CPC ............ H04W 72/20; H04W 28/0252; H04W 72/121; H04W 72/1263; H04W 72/51; H04W 92/18; H04L 69/324

See application file for complete search history.

(56) References Cited

U.S. PATENT DOCUMENTS

| | | | |
|---|---|---|---|
| 2016/0302248 A1 | 10/2016 | Yi et al. | |
| 2016/0323892 A1 | 11/2016 | Pradini et al. | |
| 2017/0034862 A1 | 2/2017 | Ma et al. | |
| 2017/0171837 A1 | 6/2017 | Chen et al. | |
| 2017/0238337 A1 | 8/2017 | Lee et al. | |
| 2018/0054693 A1 | 2/2018 | Agiwal et al. | |
| 2018/0191551 A1* | 7/2018 | Chun | H04W 76/27 |
| 2018/0213550 A1 | 7/2018 | Li et al. | |
| 2018/0242115 A1* | 8/2018 | Kim | H04W 8/02 |
| 2019/0059074 A1 | 2/2019 | Ozturk et al. | |
| 2019/0239112 A1 | 8/2019 | Rao et al. | |
| 2021/0153065 A1 | 5/2021 | Adjakple et al. | |

FOREIGN PATENT DOCUMENTS

| | | |
|---|---|---|
| CN | 107580788 A | 1/2018 |
| CN | 108270534 A | 7/2018 |
| JP | 2015-526982 A | 9/2015 |
| JP | 2017-515382 A | 6/2017 |
| JP | 2018-509050 A | 3/2018 |
| KR | 10-2020-0023116 A | 3/2020 |
| WO | 2017/171906 A1 | 10/2017 |
| WO | 2018/077043 A1 | 5/2018 |

OTHER PUBLICATIONS

Extended European Search Report with the supplementary European search report and the European search opinion issued by the European Patent Office for corresponding European Patent Application No. 18935790.8-1215, dated Oct. 11, 2021.

LG Electronics Inc., "QoS flow to DRB mapping", Agenda Item: 3.2.1.3 (FS_NR_newRAT), 3GPP TSG-RAN WG2 NR Ad Hoc, R2-1700284, Spokane, USA, Jan. 17-19, 2017.

Ericsson, "Qos Flow remapping and end marker", Agenda Item: 10.3.4.3, 3GPP TSG-RAN WG2 Meeting #101bis, R2-1805507, Sanya, P.R. China, Apr. 16-20, 2018.

Huawei et al., "Support of unicast and groupcast for eV2X", Agenda Item: 9.10.4, 3GPP TSG-RAN WG2 Meeting #101, R2-1801903, Athens, Greece, Feb. 26-Mar. 2, 2018.

The Examination Report issued by the Indian Patent Office for corresponding Indian Patent Application No. 202137004969, mailed on Jan. 31, 2022, with an English translation.

Notice of Reasons for Refusal issued by the Japan Patent Office for corresponding Japanese Patent Application No. 2021-510020, mailed on May 31, 2022, with an English translation.

Convida Wireless, "SDAP Header Format", Agenda item: 10.3.4.2, 3GPP TSG-RAN WG2 Meeting #99, R2-1709525 (Resubmission of R2-1707351), Berlin, Germany, Aug. 21-25, 2017.

Huawei et al., "A New Protocol Layer for QoS Flow to DRB Mapping", Agenda item: 3.2.1.3, 3GPP TSG-RAN2 Meeting Ad hoc, R2-1700088, Spokane, Washington, USA, Jan. 17-19, 2017.

First Notification of Office Action and Search Report issued by the China National Intellectual Property Administration for corresponding Chinese patent application No. 201880094628.9, dated Apr. 28, 2023, with an English translation.

Non-Final Office Action issued by the United States Patent and Trademark Office for corresponding U.S. Appl. No. 17/173,136, electronically delivered on Jun. 17, 2022.

Final Office Action issued by the United States Patent and Trademark Office for corresponding U.S. Appl. No. 17/173,136, electronically delivered on Nov. 9, 2022.

Notice of Allowance issued by the United States Patent and Trademark Office for corresponding U.S. Appl. No. 17/173,136, electronically delivered on Feb. 27, 2023.

Notice of Preliminary Rejection issued by the Korean Intellectual Property Office for corresponding Korean Patent Application No. 10-2021-7005551, mailed on Feb. 27, 2024, with an English translation.

Communication pursuant to Article 94(3) EPC issued by the European Patent Office for corresponding European Patent Application No. 18 935 790.8-1215, mailed on Sep. 1, 2023.

Second Notification of Office Action and search report issued by the China National Intellectual Property Administration for corresponding Chinese Patent Application No. 201880094628.9, mailed on Sep. 29, 2023, with an English translation.

\* cited by examiner

METHOD AND APPARATUS FOR TRANSMITTING DATA AND COMMUNICATION SYSTEM

CROSS-REFERENCE TO RELATED APPLICATION

This application is a continuation application of U.S. application Ser. No. 17/173,136 filed on Feb. 10, 2021, which is a continuation of International Application PCT/CN2018/107410 filed on Sep. 25, 2018, and designated the U.S., the entire contents of each are incorporated herein by reference.

TECHNICAL FIELD

This disclosure relates to the field of communication technologies, and in particular to a method and apparatus for transmitting data of vehicle communication (V2X) services and a communication system.

BACKGROUND

Vehicle communication services are called V2X services. V2X services may include multiple types, such as vehicle-to-vehicle (V2V) services, vehicle-to-infrastructure (V2I) services, and vehicle-to-pedestrian (V2P) services, etc.

V2X services may be provided via a PC5 interface and/or a Uu interface. V2X services transmitted via a PC5 interface may be provided by V2X sidelink communication. The V2X sidelink communication is a communication mode in which terminal equipments may directly communicate with each other via a PC5 interface.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in the long-term evolution (LTE), a data transmission mode of V2X sidelink communication is mainly broadcast in a physical layer (PHY); in the new radio (NR) technology, in order to support more application scenarios, V2X may use unicast or groupcast transmission in the physical layer; in existing techniques, although a physical (PHY) layer of a terminal equipment may be notified of a transmission mode in which data are transmitted, there is still a lack of in-depth research on how other layers of the terminal equipment need to work so that the physical layer may transmit data in an appropriate transmission mode.

Embodiments of this disclosure provide a method and apparatus for transmitting data and a communication system, in which a media access control layer of the terminal equipment generates at least one protocol data unit (PDU) in a way that transmission modes to which service data units (SDU) contained in a PDU correspond are identical, hence, the PDU is able to correspond to the transmission mode, and a physical layer is facilitated to transmit data in an appropriate transmission mode after receiving the PDU (i.e. a transport block).

According to a first aspect of the embodiments of this disclosure, there is provided a communication apparatus, configured in a terminal equipment, the communication apparatus including: a first acquiring unit configured to acquire or select communication resources determined based on a mapping between vehicle communication (V2X) services and communication resource parameters; and a communication unit configured to transmit target V2X services by using the communication resources.

According to a second aspect of the embodiments of this disclosure, there is provided a communication apparatus, configured in a network device, the communication apparatus including: a second acquiring unit configured to acquire or determine a mapping between vehicle communication (V2X) services and communication resource parameters.

According to a third aspect of the embodiments of this disclosure, there is provided a communication system, including a terminal equipment and a network device, the terminal equipment including the communication apparatus as described in the first aspect, and the network device including the communication apparatus as described in the second aspect.

An advantage of the embodiments of this disclosure exists in that a media access stratum of the terminal equipment generates at least one protocol data unit (PDU) in a way that transmission modes to which service data units (SDU) contained in a PDU correspond are identical, hence, the PDU is able to correspond to the transmission mode, and a physical layer is facilitated to transmit data in an appropriate transmission mode.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
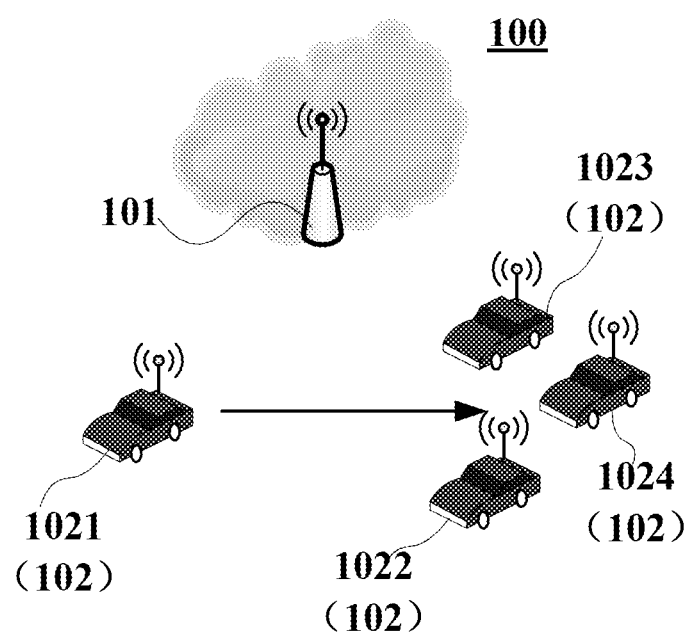
FIG. 1 is a schematic diagram of a communication system of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and multiple terminal equipments 102, the multiple terminal equipments 102 being, for example, a terminal equipment 1021, a terminal equipment 1022, a terminal equipment 1023, and a terminal equipment 1024.

In the embodiment of this disclosure, existing traffics or traffics that may be implemented in the future may be performed between the network device 101 and the terminal equipments 102. For example, such traffics may include but not limited to enhanced mobile broadband (eMBB), massive machine type communication (MTC), and ultra-reliable and low-latency communication (URLLC), etc.

The terminal equipments 102 may transmit data to the network device 101 and receive feedback information from the network device 101. The network device 101 may transmit data to one or more terminal equipments 102, and receive feedback transmitted by the terminal equipments 102.

Furthermore, the terminal equipments 102 may transmit information on V2X services to other terminal equipments 102, or the terminal equipments 102 may receive information on V2X services from other terminal equipments 102. For example, the terminal equipment 1021 transmits information on V2X services to terminal equipment 1022, or the terminal equipment 1021 receives information on V2X services to terminal equipment 1022. For another example, the terminal equipment 1021 transmits information on V2X services to terminal equipment 1022, terminal equipment 1023 and terminal equipment 1024.

Following description shall be given by taking a network device in a communication system as a transmitter end and a terminal equipment therein as a receiver end as examples. However, this disclosure is not limited thereto, and the transmitter end and the receiver end may also be other devices. For example, this disclosure is applicable not only to signal transmission between two terminal equipments, but also to signal transmission between a network device and a terminal equipment.

Embodiment 1

The embodiment of this disclosure provides a communication method, which may be carried out by a terminal equipment.

Figure 2:
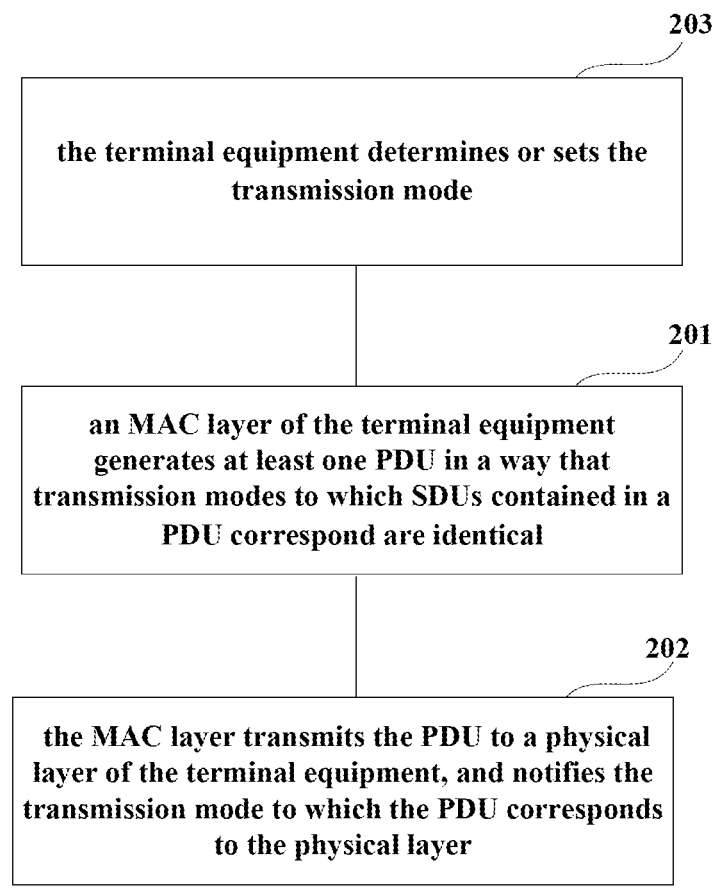
FIG. 2 is a schematic diagram of the method for transmitting data of vehicle communication (V2X) services of Embodiment 1 of this disclosure.

FIG. 2 is a schematic diagram of the method for transmitting data of vehicle communication (V2X) services of this embodiment. As shown in FIG. 2, the method includes:
- step 201: a media access control (MAC) layer of the terminal equipment generates at least one protocol data unit (PDU) in a way that transmission modes to which service data units (SDU) contained in a PDU correspond are identical; and
- step 202: the MAC layer transmits the PDU to a physical layer of the terminal equipment, and notifies the transmission mode to which the PDU corresponds to the physical layer.

According to this embodiment, the media access control layer of the terminal equipment generates at least one protocol data unit (PDU) in a way that transmission modes to which service data units (SDU) contained in a PDU correspond are identical, hence, the PDU is able to correspond to the transmission mode, and a physical layer is facilitated to transmit data in an corresponding transmission mode.

For example, SDUs in a PDU corresponds to an identical transmission mode, and the physical layer receives the PDU and is indicated a transmission mode to which the PDU corresponds. The physical layer is able to process the PDU to generate data to be transmitted. The data to be transmitted corresponds to the transmission mode, that is, the data to be transmitted may be transmitted in this transmission mode. The PDU received by the physical layer is also referred to as a transport block (TB).

In this embodiment, the transmission mode includes broadcast, unicast, or groupcast.

For example, data transfer may be performed between a terminal equipment and a roadside unit (RSU) or between two terminal equipments, and the data may be transferred in a unicast mode; for another example, terminal equipments in close proximity may form a group, such as a platooning, and the terminal equipments may transmit data to group members in a groupcast mode.

In this embodiment, as shown in FIG. 2, the method may further include:
- step 203: the terminal equipment determines or sets the transmission mode.

Therefore, in step 201, the SDU contained in the PDU generated by the media access control (MAC) layer of the terminal equipment may correspond to the transmission mode determined or set in step 203.

In step 203 of this embodiment, in one implementation, an upper layer of the terminal equipment determines the transmission mode; or, in another implementation, an access stratum (AS) layer of the terminal equipment determines the transmission mode; or, in a further implementation, the terminal equipment may set the transmission mode according to the indication information used for configuring or indicating the transmission mode.

Hereinafter, each of the above implementations in step 203 shall be described respectively.

Implementation 1: determining the transmission mode by the upper layer of the terminal equipment.

In this embodiment, the upper layer of the terminal equipment refers to a V2X application layer or a non-access stratum (NAS) layer.

In Implementation 1, the upper layer of the terminal equipment may determine the transmission mode by using two methods. Method 1: the upper layer of the terminal equipment indicates data packets of the V2X services and a transmission mode to which the data packets of the V2X services correspond; and method 2: a packet filter of a non-access stratum (NAS) layer of the terminal equipment determines a transmission mode to which data in quality of service flows correspond.

Figure 3:
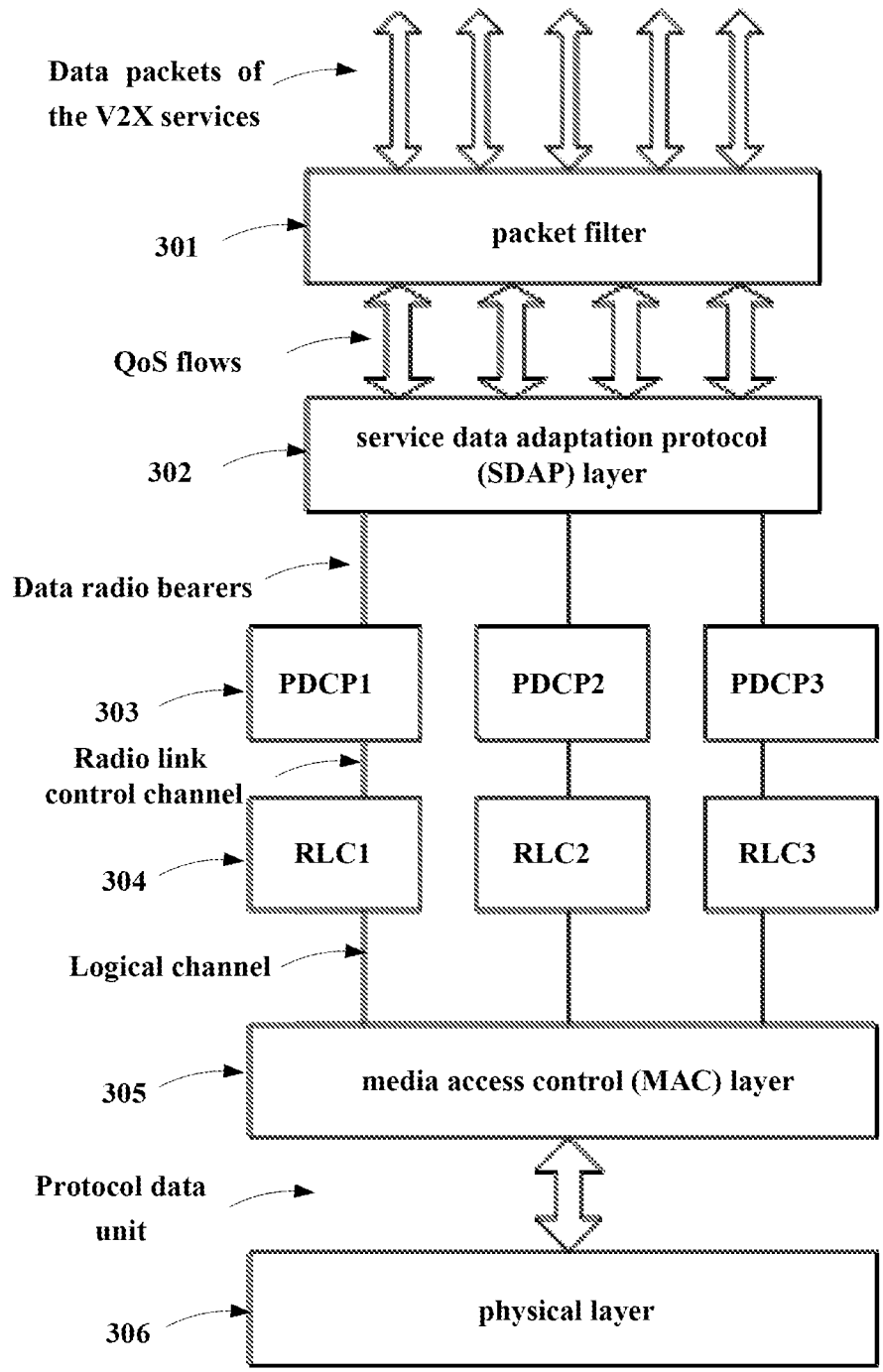
FIG. 3 is a schematic diagram of a part of compositions of the terminal equipment of this disclosure.

FIG. 3 is a schematic diagram of a part of compositions of the terminal equipment, 301 and 302 are optional. How corresponding parts of the terminal equipment work in Implementation 1 shall be described below with reference to FIG. 3.

In method 1, the upper layer of the terminal equipment indicates the data packets of the V2X services and the transmission mode to which the data packet(s) of the V2X services correspond. The transmission mode may be indicated to the packet filter unit, and/or a service data adaptation protocol (SDAP) layer, and/or a packet data convergence protocol (PDCP) layer.

When the transmission mode is indicated to the packet filter, the packet filter of the terminal equipment may map the data packets to the quality of service (QoS) flows according to the indicated transmission mode. Transmission modes to which data packets in a quality of service flow correspond are identical.

A situation where the transmission mode is indicated to the packet filter shall be explained first. The corresponding parts of the terminal equipment work as follows:
- step 1.1: as shown in FIG. 3, the packet filter 301 of the terminal equipment may map the data packets to the quality of service (QoS) flows according to the data packets and transmission mode indicated by the upper layer. Transmission modes to which data packets in a QoS flow are identical; hence, there exists a correspondence between the quality of service flows and transmission modes; furthermore, the packet filter 301 may mark the transmission mode of the quality of service flows;

step 1.2: the service data adaptation protocol (SDAP) layer 302 of the terminal equipment may map the QoS flows to data radio bearers (DRBs), and a result of mapping may be: transmission modes to which quality of service flows on a DRB correspond are identical; hence, the DRBs correspond to the transmission modes;

step 1.3: the packet data convergence protocol (PDCP) layer 303 of the terminal equipment may map the QoS flows onto the data radio bearers (DRBs); transmission modes to which quality of service flows on a DRB correspond are identical; hence, the DRBs correspond to the transmission modes; it should be noted that as the SDAP layer 302 is optional, step 1.2 is also optional; in a case of existence of step 1.2, the SDAP layer 302 maps the QoS flows onto the DRBs, hence, step 1.3 may not exist; in a case of no step 1.2, step 1.3 may exist, and the PDCP layer 303 maps the QoS flows onto the DRBs;

step 1.4: the data in the data radio bearers (DRBs) are transmitted to a radio link control (RLC) layer 304 via a corresponding radio link control (RLC) channel, and transmitted to a media access control (MAC) layer 305 via a corresponding logical channel (LCH); an SDU of the MAC layer 305 comes from the logical channel (LCH); in this procedure, the data radio bearers (DRBs) correspond to the logical channel (LCH), hence, the logical channel (LCH) corresponds to the transmission mode, and the SDU from the MAC layer 305 of the logical channel also forms a correspondence with the transmission mode;

step 1.5: the MAC layer 305 may assemble the PDU according to the transmission mode to which the SDU corresponds, so that transmission modes to which the SDU included in the PDU corresponds are all identical, as shown in step 201 in FIG. 2; and furthermore, the MAC layer 305 may transmit the PDU (i.e. a transport block) to the physical layer 306, and notify the physical layer 306 of the transmission mode to which the PDU (i.e. the transport block) corresponds.

Following are particular examples regarding steps 1.1 to 1.5.

For example, the upper layer of the terminal equipment indicates that data packets 1/2/3/4 of the V2X services are transmitted in a unicast mode, and data packets 5/6 are transmitted in a groupcast mode. In the packet filter 301, the data packets 1/2 may be mapped to a QoS flow1 (corresponding to the unicast transmission mode), the data packet 3 may be mapped to a QoS flow2 (corresponding to the unicast transmission mode), the data packet 4 may be mapped to a QoS flow3 (corresponding to the unicast transmission mode), and the data packets 5/6 may be mapped to a QoS flow4 (corresponding to the groupcast transmission mode). At the SDAP layer 302 of the terminal equipment, the QoS flows 1/2 may be mapped to the data radio bearer DRB1 (corresponding to the unicast transmission mode), QoS flow3 may be mapped to DRB2 (corresponding to the unicast transmission mode), and the QoS flow 4 may be mapped to DRB3 (corresponding to the groupcast transmission mode). In this way, the transmission modes to which logical channels corresponds are unicast, unicast and groupcast, respectively, DRB1, DRB2 and DRB3 corresponding to the logical channels. The MAC layer 305 performs logical channel priority processing, and generated MAC PDUs include data of the logical channels to which DRB1 and DRB2 correspond, that is, the MAC SDUs are from the logical channels to which DRB1 and DRB2 correspond (corresponding to the unicast transmission mode), in which case a transmission mode to which the MAC SDUs correspond is unicast; or generated MAC PDUs include data of the logical channel to which DRB3 corresponds, that is, the MAC SDUs are from the logical channel to which DRB3 corresponds (corresponding to the groupcast transmission mode), in which case a transmission mode to which the MAC SDUs correspond is groupcast. The MAC layer 305 notifies the physical layer 306 of the transmission mode to which the MAC PDUs correspond, and transmits the MAC PDUs to the physical layer 306 for subsequent processing by the physical layer 306. For example, the physical layer 306 processes the MAC PDUs to generate data to be transmitted. The data to be transmitted correspond to the transmission mode, that is, the data to be transmitted may be transmitted in the transmission mode.

The case where the transmission mode is indicated to the packet filter in method 1 of Implementation 1 is described above.

In a case where the transmission mode is indicated to the SDAP layer 302, the service data adaptation protocol (SDAP) layer maps the quality of service flows or the Data packets of the V2X services to the data radio bearers (DRBs) according to the indicated transmission mode, and transmission modes to which the quality of service flows or the Data packets of the V2X services on a DRB correspond are identical. In addition, reference may be made to step 1.3, step 1.4 and step 1.5 for processing of the PDCP layer 303, the RLC layer 304 and the MAC layer 305.

In a case where the transmission mode is indicated to the packet data convergence protocol (PDCP) layer 303 of the terminal equipment, the quality of service flows or the Data packets of the V2X services are mapped to the data radio bearers (DRBs) according to the indicated transmission mode, the transmission modes to which the quality of service flows or Data packets of the V2X services on a DRB correspond are identical. In addition, reference may be made to step 1.4 and step 1.5 for processing of the RLC layer 304 and the MAC layer 305.

In method 2 of Implementation 1, the packet filter 301 of the non-access stratum (NAS) layer of the terminal equipment determines the transmission mode to which the data in the quality of service flows.

For example, the packet filter of the terminal equipment maps the Data packets of the V2X services to the quality of service flows (QoS flows), the transmission modes to which the data packets in a quality of service flow correspond are identical, and the packet filter unit determines a transmission mode to which a quality of service flow corresponds. In addition, the packet filter may notify the SDAP of the transmission mode. In addition, reference may be made to step 1.2, step 1.3, step 1.4 and step 1.5 for processing of the SDAP layer 302, the PDCP layer 303, the RLC layer 304 and the MAC layer 305.

Implementation 2: determining the transmission mode by the access stratum of the terminal equipment.

In this embodiment, the access stratum (AS) layer of the terminal equipment may include the SDAP layer 302, the PDCP layer 303, the RLC layer 304, and the MAC layer 305. In Implementation 2, the transmission mode may be determined by the SDAP layer 302, the PDCP layer 303, the RLC layer 304, or the MAC layer 305.

A case where the SDAP layer 302 determines the transmission mode: the service data adaptation protocol (SDAP)

layer may determine a transmission mode to which the QoS flows or Data packets of the V2X services correspond, and map the QoS flows or the Data packets of the V2X services to the data radio bearers (DRBs), where transmission modes to which the QoS flows or the Data packets of the V2X services on a DRB are identical; or, the service data adaptation protocol (SDAP) layer maps the QoS flows or the Data packets of the V2X services onto the data radio bearers (DRBs), and determines a transmission mode to which the DRBs correspond.

For example, the Data packets of the V2X services are mapped to the QoS flows by the packet filter 301. The SDAP layer 302 determines a transmission mode to which the QoS flows correspond, and maps the QoS flows to the DRBs, so that transmission modes to which QoS flows correspond are identical, a DRB corresponding the QoS flows; or, the SDAP layer 302 maps the QoS flows to the DRBs, and the SDAP layer determines a transmission mode to the DRBs correspond. In addition, reference may be made to step 1.3, step 1.4 and step 1.5 for processing of the PDCP layer 303, the RLC layer 304 and the MAC layer 305.

A case where the PDCP layer 303 determines the transmission mode: the packet data convergence protocol (PDCP) layer determines a transmission mode to which the DRBs correspond, or a transmission mode to which a radio link control channel (RLC) corresponds, or a transmission mode to which a logical channel corresponds, the DRBs corresponding to the radio link control channel (RLC) and the logical channel.

For example, the Data packets of the V2X services are mapped to the QoS flows by the packet filter 301, the SDAP layer 302 maps the QoS flows to the DRBs, and the PDCP layer 303 determines the transmission mode to which the DRBs correspond or the transmission mode to which the radio link control channel (RLC) corresponds or the transmission mode to which the logical channel corresponds, the DRBs corresponding to the radio link control channel (RLC) and the logical channel. In addition, reference may be made to step 1.4 and step 1.5 for processing of the RLC layer 304 and the MAC layer 305.

A case where the RLC layer 304 determines the transmission mode: the radio link control (RLC) layer 304 determines a transmission mode to which a radio link control (RLC) channel corresponds or a transmission mode to which a logical channel corresponds.

For example, the Data packets of the V2X services are mapped to the QoS flows by the packet filter 301, and the SDAP layer 302 maps the QoS flows to the DRBs. The RLC layer 304 determines the transmission mode to which the RLC channel corresponds or the transmission mode to which the logical channel corresponds, the DRBs corresponding to the radio link control channel (RLC) and the logical channel. In addition, reference may be made to step 1.5 for processing of the MAC layer 305.

A case where the transmission mode is determined by the MAC layer 305: the media access control (MAC) layer 305 determines a transmission mode to which a logical channel corresponds or a transmission mode to which an MAC PDU corresponds.

For example, the Data packets of the V2X services are mapped to the QoS flows by the packet filter 301, and the SDAP layer 302 maps the QoS flows to the DRBs. Data of a logical channel to which the DRBs correspond are transmitted to the MAC layer as MAC SDUs, and the MAC is subjected to a logical channel priority processing procedure to generate MAC PDUs including the MAC SDUs. The MAC layer 305 determines the transmission mode to which the logical channel corresponds or the transmission mode to which the MAC PDUs correspond. In addition, the MAC layer 305 may notify the physical layer 306 of the MAC PDUs and a transmission mode corresponding thereto.

In Implementation 1 and Implementation 2 of this embodiment, the terminal equipment determines the transmission mode, and each layer of the terminal equipment may learn the transmission mode in at least one method.

In an example, the method for learning the transmission mode may be: a higher layer of the terminal equipment notifies the transmission mode to a lower layer of the terminal equipment. For example, the SDAP layer notifies the PDCP layer of the transmission mode to which the DRBs correspond, and/or the PDCP layer notifies the RLC layer of the transmission mode to which the RLC channel corresponds, and/or the RLC notifies the MAC of the transmission mode of the logical channel. In addition, notification may be performed across layers; for example, the PDCP layer directly notifies the MAC layer of the transmission mode of the logical channel.

In another example, the method for learning the transmission mode may be: the terminal equipment marks the transmission modes to which the data packets of the V2X services, and/or the QoS flows, and/or the data radio bearers (DRBs), and/or the radio link control (RLC) channels, and/or the logical channels correspond, such as marking the transmission modes of the data packets of the V2X service and/or the quality of service flows and/or the data radio bearers, and reading the flows/DRBs/RLC/logical channel at each layer.

In Implementation 1 and Implementation 2 of this embodiment, the terminal equipment determines the transmission mode. Therefore, the terminal equipment may notify the network device of the transmission mode, so that the network device allocates appropriate sidelink resources for transmitting data, such as when the terminal equipment is within network coverage, the network device is facilitated to allocate appropriate sidelink resources for transmitting data.

The terminal equipment may notify the network device of the transmission mode via a sidelink UE information radio resource control (RRC) message, or a sidelink buffer status report (BSR), or a scheduling request (SR).

For example, in a case where the terminal equipment notifies the network device of the transmission mode via the sidelink UE information RRC message, the RRC message includes a transmission mode to which V2X services, and/or QoS flows, and/or a DRB, and/or a logical channel, of the UE, correspond;

in a case where the terminal equipment notifies the network device of the transmission mode via the BSR, the BSR includes a transmission mode to which a logical channel and/or a logical channel group corresponds;

and in a case where the terminal equipment notifies the network device of the transmission mode via the SR, the SR includes a transmission mode to which a logical channel corresponds, the SR corresponding to the logical channel, or the SR includes a logical channel identifier and a transmission mode to which the logical channel corresponds.

Correspondingly, when the network device receives a notification of the transmission mode from the terminal equipment, it may allocate a sidelink resource pool and/or a sidelink grant suitable for the transmission mode for the UE.

Implementation 3: the terminal equipment sets the transmission mode according to an indication information used for configuring or indicating the transmission mode.

In Implementation 3, the indication information may be provided by the network device, which may be a network device of a core network or a network device of an access network; the indication information may also be pre-configured to the terminal equipment; and furthermore, the indication information may be provided by the roadside unit (RSU) for the terminal equipment.

In Implementation 3, in a case where the indication information is provided by the network device of the core network, the terminal equipment may receive the indication information via dedicated RRC signaling or system information.

The indication information provided by the network device of the core network may be used to configure a transmission mode to which data packets and/or QoS flows on the sidelink correspond.

The indication information includes configuration of transmission modes of each data packets of V2X services on one or more sidelinks (such as indicating transmission modes for V2X service types), or includes configuration of transmission modes of one or more QoS flows (the configuration including a QoS flow ID and a transmission mode to which it corresponds).

For example, when the terminal equipment is within coverage of the network device of the core network, after receiving the indication information, the terminal equipment may configure the transmission mode to which the data packets and/or QoS flows on the sidelink correspond according to the indication information. After the transmission mode is set, reference may be made to the description of Implementation 1 for behaviors of each layer of the terminal equipment.

In Implementation 3, in a case where the indication information is provided by the network device of the access network, the terminal equipment may receive the indication information via dedicated RRC signaling or system information or MAC control signaling or physical layer control signaling.

In a case where the terminal equipment receives the indication information via the dedicated RRC signaling or system information, the indication information may be used for configuring the transmission mode to which the DRBs, and/or the RLC channel, and/or the logical channel on the side link correspond. The indication information includes a DRB identifier (ID) and/or an RLC channel identifier and/or a logical channel identifier on the sidelink and transmission modes corresponding thereto.

For example, when the terminal equipment is within the coverage of the network device of the access network, after receiving the indication information, the terminal equipment may configure the transmission modes of the DRBs, and/or the RLC channel, and/or the logical channel on the sidelink according to the indication information. After the transmission mode is set, reference may be made to the description of Implementation 2 for behaviors of each layer of the terminal equipment.

In a case where the terminal equipment receives the indication information via the MAC control signaling, the indication information may be used for configuring the transmission mode to which a logical channel or a logical channel group on the sidelink corresponds. The indication information includes a logical channel identifier or a logical channel group identifier on the sidelink and a transmission mode corresponding thereto, or the indication information includes a bitmap file for indicating transmission modes of which logical channels or logical channel groups are included in the MAC CE, and transmission modes to which the included logical channels or logical channel groups correspond, to the terminal equipment.

In a case where the terminal equipment receives the indication information via the physical layer control signaling, the indication information may also include the transmission mode to which the scheduled sidelink data correspond, such a transmission mode to which a scheduled sidelink MAC PDU (i.e., a transport block) corresponds.

For example, the indication information may be included in downlink control information (DCI), such as a sidelink grant, and the indication information may indicate a transmission mode to which sidelink data scheduled this time or N (N is a positive integer) times correspond, such as a transmission mode to which a sidelink MAC PDU (i.e., a transport block) scheduled this time or N times corresponds, and the terminal equipment may set that a transmission mode to which sidelink data to be transmitted this time or N times correspond is broadcast, groupcast or unicast according to the indication information, such as setting a transmission mode to which a sidelink MAC PDU (i.e., a transport block) to be transmitted this time or N times as broadcast, groupcast or unicast. N times mean this time and next few times.

In Implementation 3, the pre-configured indication information may be used for configuring a transmission mode to which data packets, and/or QoS flows, and/or DRBs, and/or an RLC channel, and/or a logical channel on the sidelink corresponds.

For example, the terminal equipment configures the transmission mode of the DRBs, and/or the RLC channel, and/or the logical channel on the sidelink according to the pre-configured indication information. After the transmission mode is set, reference may be made to the description of Implementation 1 and Implementation 2 for behaviors of each layer of the terminal equipment.

In step 203 of this embodiment, according to Implementation 1 and Implementation 2, the upper layer or access stratum of the terminal equipment determines the transmission mode. A basis for determining the transmission method in Implementation 1 and Implementation 2 by the terminal equipment shall be described below.

In this embodiment, the upper layer or access stratum of the terminal equipment may determine the transmission mode to which to-be-transmitted data correspond based on QoS characteristics and/or QoS grade indication of the data, and/or a target terminal equipment to which the data are transmitted, and/or contents of information contained in the data, and/or a geographical location of the terminal equipment.

In this embodiment, the QoS characteristics include: priorities of the data, and/or latency of the data, and/or reliabilities of the data, and/or data rates of the data, and/or a communication range of the data.

For example, a transmission mode of high-priority data with a priority higher than a first threshold may be unicast or groupcast, and a transmission mode of low-priority data with a priority lower than a second threshold may be broadcast; a transmission mode of high-latency-requirement data with a latency requirement higher than a third threshold may be unicast or groupcast, and a transmission mode of loose-latency-requirement data with a latency requirement lower than a fourth threshold may be broadcast; a transmission mode of high-reliability-requirement data with a reliability requirement higher than a fifth threshold may be unicast or groupcast, and a transmission mode of low-reliability-requirement data with a reliability requirement lower than a sixth threshold may be broadcast; a transmission mode of high-data-rate data with a data rate higher than a seventh threshold may be broadcast, and a transmission mode of low-data-rate data with a data rate lower than an eighth threshold may be unicast; a transmission mode of small-communication-range data with a communication range smaller than a ninth threshold may be unicast, and a transmission mode of large-communication-range data with a communication range larger than a tenth threshold may be groupcast or broadcast, and so on.

In this embodiment, there may exist a mapping between the QoS grade indication of the data and the transmission mode, hence, the transmission mode may be determined based on the QoS grade indication. The QoS grade indication of the data may correspond to values of more than two QoS characteristics. For example, when the QoS grade indication is of a certain grade, the grade indication corresponds to respective first values of multiple QoS characteristics, and when the QoS grade indication is of another grade, the grade indication corresponds to respective second values of the multiple QoS characteristics. A QoS feature includes: priorities of the data, or latency of the data, or reliabilities of the data, or data rates of the data, or a communication range of the data.

In this embodiment, the transmission mode of the data is determined based on the destination terminal equipment to which the data to be transmitted are transmitted. For example: in a group, data transmitted by the terminal equipment as a group member to other terminal equipments as other group members may be transmitted in the groupcast mode, data transmitted to a specific terminal equipment as a group member or a terminal equipment as a group head may be transmitted in the unicast mode, and data transmitted to terminal equipments in and outside a group may be transmitted in the broadcast mode.

In this embodiment, the contents of information contained in the data include: a road condition, and/or environment, and/or information on an event, or include: a service request, and/or feedback, or group common information. Determining the transmission mode of the data based on the contents of the information contained in the data may be, for example, the transmission mode of the data including such information as a road condition, environment, an accident, etc., may be broadcast; the transmission mode of the data including a service request, feedback, etc., may be unicast, and the transmission mode of the data including group common information may be groupcast; the group common information may be, for example, group security information and/or fleet (platooning) notification information, etc.

In this embodiment, determining the transmission mode to which the data correspond based on the geographical location of the terminal equipment may be, for example, the transmission mode of the data may be groupcast when the geographical location of the terminal equipment is in area A, and the transmission mode of the data may be unicast when the geographical location of the terminal equipment is in area B, etc.

In this embodiment, suitable transmission modes of unicast, or groupcast, or broadcast may be used according to the characteristics of the data to be transmitted, which is conducive to data transmission satisfying their QoS or being transmitted to a specific destination, while ensuring high radio resource utilization.

In addition, in step 203 of this embodiment, in Implementation 3 where the terminal equipment sets the transmission mode according to the indication information, the transmission mode indicated by the indication information may also be determined based on the above basis. For example, the network device of the core network, the network device of the access network, or the roadside unit determines the transmission mode to which the data to be transmitted correspond based on the QoS characteristics of the data to be transmitted, and/or the QoS grade indication, and/or the destination terminal equipment to which the data are to be transmitted, and/or the contents of the information contained in the data, and/or the geographical location of the terminal equipment, and the transmission mode is indicated to the terminal equipment via the indication information; or, in the indication information pre-configured to the terminal equipment, the transmission mode to which the data to be transmitted correspond is also determined based on the QoS characteristics of the data to be transmitted, and/or the QoS grade indication, and/or the destination terminal equipment to which the data are to be transmitted, and/or the contents of the information contained in the data, and/or the geographical location of the terminal equipment.

According to this embodiment, the media access control layer of the terminal equipment generates at least one PDU in a mode identical to a transmission mode to which a service data unit (SDU) contained in a protocol data unit (PDU) corresponds, hence, the PDU is able to correspond to the transmission mode, and a physical layer is facilitated to transmit data in an appropriate transmission mode. And furthermore, in this embodiment, the terminal equipment determines or sets the transmission mode according to the indication information, and the layers of the terminal equipment perform corresponding processing, which are simple in implementation.

Embodiment 2

Embodiment 2 provides a data transmission method, which is carried out by a network device.

Figure 4:
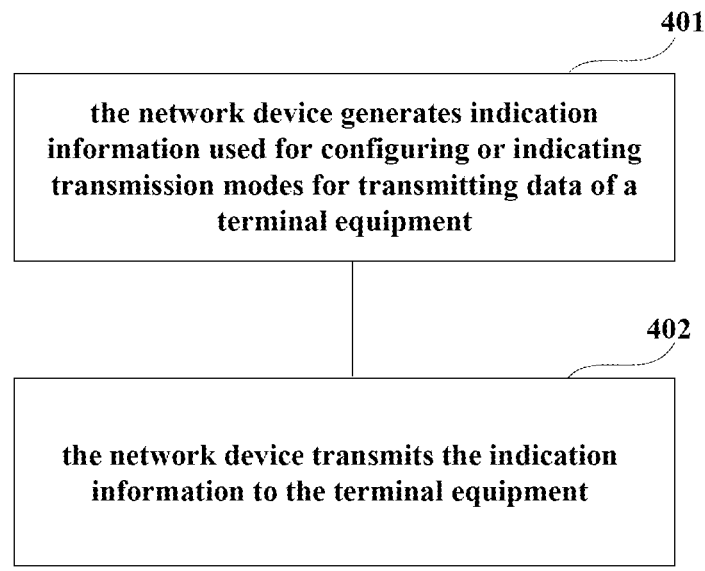
FIG. 4 is a schematic diagram of the data transmission method of one implementation of Embodiment 2 of this disclosure.

FIG. 4 is a schematic diagram of the data transmission method of one implementation of Embodiment 2 of this disclosure. The implementation of Embodiment 2 corresponds to Implementation 3 in step 203 of Embodiment 1. As shown in FIG. 4, the method includes:

step 401: the network device generates indication information used for configuring or indicating transmission modes for transmitting data of a terminal equipment; and step 402: the network device transmits the indication information to the terminal equipment.

In this embodiment, the transmission modes include unicast, groupcast, or broadcast.

In this embodiment, the network device may be a network device of a core network, or a network device of an access network.

In this embodiment, when the network device is a network device of a core network, the indication information transmitted by the network device is used for configuring transmission modes to which data packets and/or QoS flows on a sidelink correspond.

In this embodiment, when the network device is a network device of an access network, the indication information transmitted by the network device of the access network is used for configuring transmission modes of DRBs on a sidelink of the terminal equipment and/or RLC channels and/or logical channels.

In this embodiment, when the network device is a network device of an access network, the indication information transmitted by the network device of the access network may contain transmission modes to which scheduled sidelink data correspond.

In this embodiment, the network device configures or indicates the transmission mode of the data of the terminal equipment in performing vehicle communication services, and the terminal equipment may set a transmission mode according to the indication information, and transmit the data of the vehicle communication services in the set transmission mode.

Figure 5:
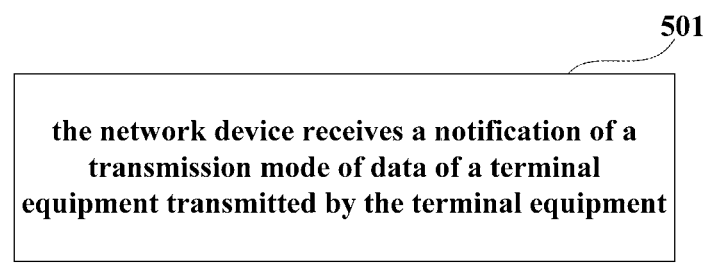
FIG. 5 is a schematic diagram of the data transmission method of another implementation of Embodiment 2 of this disclosure.

FIG. 5 is a schematic diagram of the data transmission method of another implementation of Embodiment 2 of this disclosure, and this implementation corresponds to Implementation 1 and Implementation 2 of step 203 of Embodiment 1. As shown in FIG. 5, the method includes:

step 501: the network device receives a notification of a transmission mode of data of a terminal equipment transmitted by the terminal equipment.

In step 501, the network device may receive the notification via a sidelink UE information radio resource control (RRC) message, or a sidelink buffer status report (BSR), or a scheduling request (SR).

In this embodiment, in the indication information described in the implementation in FIG. 4 or the received notification described in the implementation in FIG. 5, the transmission mode may be determined based on QoS characteristics and/or QoS grade indication of to-be-transmitted data, and/or a target terminal equipment to which the data are transmitted, and/or contents of information contained in the data, and/or a geographical location of the terminal equipment.

The QoS characteristics include: priorities of the data, and/or latency of the data, and/or reliabilities of the data, and/or data rates of the data, and/or a communication range of the data; and the contents of information contained in the data include: a road condition, and/or environment, and/or information on an event, or include: a service request, and/or feedback, or group common information.

Furthermore, step 501 may be combined with FIG. 4, that is, the method in FIG. 4 may include step 401, step 402 and step 501.

According to this embodiment, the physical layer is facilitated to transmit data in an appropriate transmission mode. And furthermore, suitable transmission modes of unicast, or groupcast, or broadcast may be used according to the characteristics of the data to be transmitted, which is conducive to data transmission satisfying their QoS or being transmitted to a specific destination, while ensuring high radio resource utilization.

Embodiment 3

Embodiment 3 of this disclosure provides an apparatus for transmitting data of vehicle communication services, provided in a terminal equipment. As a principle of the apparatus for solving problems is similar to that of the method in Embodiment 1, reference may be made to the implementation of the method in Embodiment 1 for implementation of this apparatus, with identical contents being going to be described herein any further.

Figure 6:
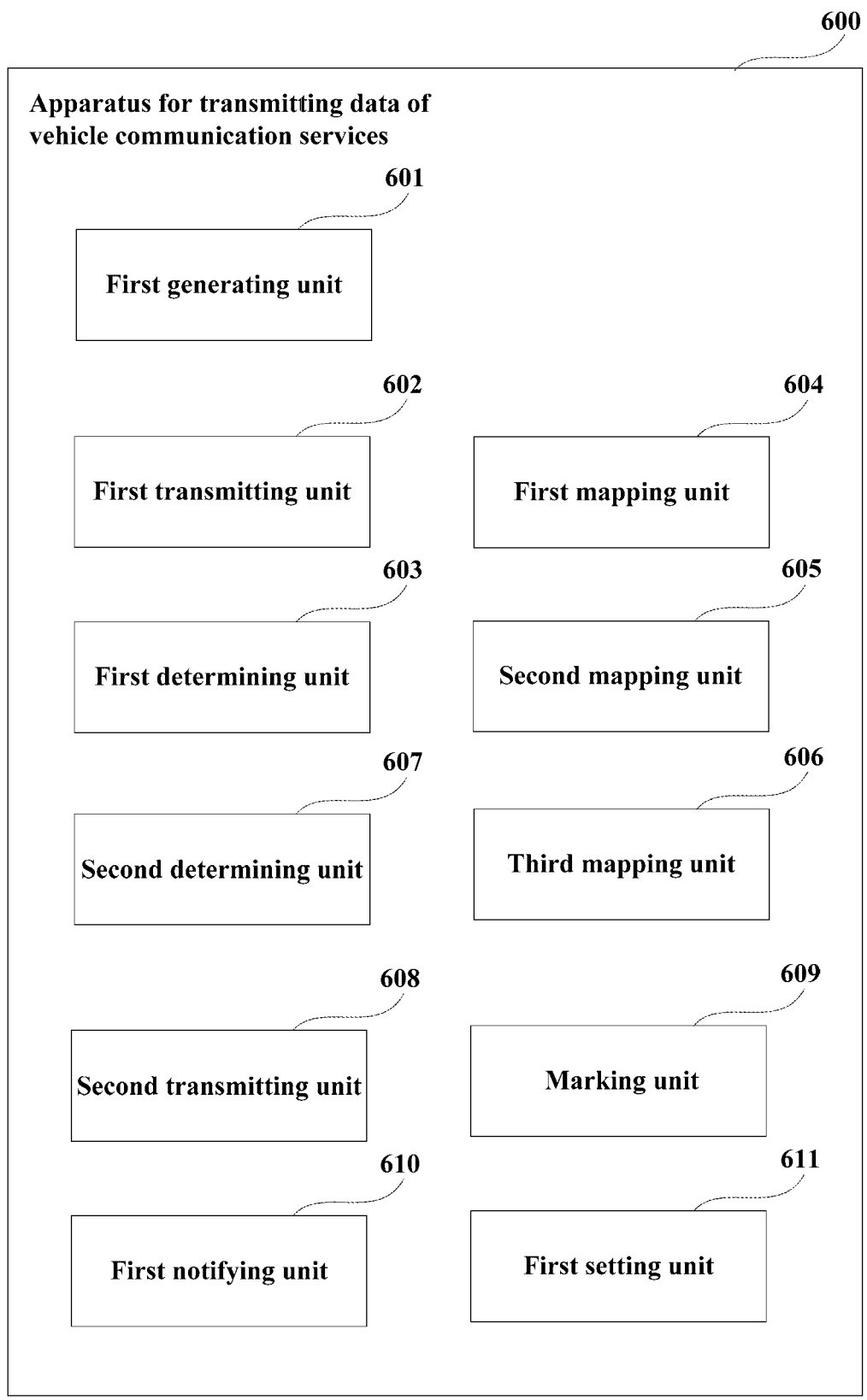
FIG. 6 is a schematic diagram of the apparatus for transmitting data of vehicle communication services of Embodiment 3 of this disclosure.

FIG. 6 is a schematic diagram of the apparatus for transmitting data of vehicle communication services of Embodiment 3 of this disclosure. As shown in FIG. 6, an apparatus 600 for transmitting data of vehicle communication services includes:

a first generating unit 601 configured in a media access control (MAC) layer of the terminal equipment and configured to generate at least one protocol data unit (PDU) in a way that transmission modes to which service data units (SDU) contained in a PDU correspond are identical; and a first transmitting unit 602 configured in the MAC layer and configured to transmit the PDU to a physical layer of the terminal equipment, and notify the transmission mode to which the PDU corresponds to the physical layer.

In this embodiment, the transmission mode includes unicast, or groupcast, or broadcast.

As shown in FIG. 6, the apparatus 600 further includes:

a first determining unit 603 configured in an upper layer of the terminal equipment and configured to determine the transmission mode.

In Implementation 1, the first determining unit 603 indicates data packets of the V2X services and a transmission mode to which the data packets of the V2X services correspond.

In Implementation 1, as shown in FIG. 6, the apparatus 600 further includes:

a first mapping unit 604 configured in a packet filter of the terminal equipment and configured to map the data packets onto quality of service (QoS) flows; and transmission modes to which data packets in a QoS flow correspond are identical.

In Implementation 1, as shown in FIG. 6, the apparatus 600 further includes:

a second mapping unit 605 configured in a service data adaptation protocol (SDAP) layer of the terminal equipment and configured to map the QoS flows or the data packets of the V2X services onto data radio bearers (DRBs); transmission modes to which QoS flows or data packets of the V2X services on a DRB correspond are identical.

In Implementation 1, as shown in FIG. 6, the apparatus 600 further includes:

a third mapping unit 606 configured in a packet data convergence protocol (PDCP) layer of the terminal equipment and configured to map the QoS flows or the data packets of the V2X services onto data radio bearers (DRBs); transmission modes to which QoS flows or data packets of the V2X services on a DRB correspond are identical.

In Implementation 1, the first determining unit 603 is configured in the packet filter. The packet filter maps the data packets onto the quality of service (QoS) flows; and transmission modes to which data packets in a QoS flow correspond are identical, and a transmission mode to which the QoS flows correspond is determined by the first determining unit.

In Implementation 2, as shown in FIG. 6, the apparatus 600 further includes:

a second determining unit 607 configured in an access stratum of the terminal equipment and configured to determine the transmission mode.

The second determining unit 607 is configured in the service data adaptation protocol (SDAP) layer, or the packet data convergence protocol (PDCP) layer, or a radio link control (RLC) layer, or the media access control (MAC) layer, of the terminal equipment, and configured to determine the transmission mode.

The second determining unit 607 is configured in the service data adaptation protocol (SDAP) layer, and the second determining unit determines the transmission modes to which the QoS flows or data packets of the V2X services correspond, and the service data adaptation protocol (SDAP)

layer maps the QoS flows or data packets of the V2X services onto data radio bearers (DRBs); wherein transmission modes to which QoS flows or data packets of the V2X services on a DRB correspond are identical; or the service data adaptation protocol (SDAP) layer maps the QoS flows or data packets of the V2X services onto data radio bearers (DRBs), and the second determining unit determines transmission modes to which the DRBs correspond.

For another example, the second determining unit 607 is configured in the packet data convergence protocol (PDCP) layer and configured to determine the transmission modes to which the DRBs correspond, or transmission modes to which radio link control (RLC) channels correspond, or transmission modes to which logical channels correspond, the DRBs corresponding to the RLC channels and the logical channels.

For a further example, the second determining unit 607 is configured in the radio link control (RLC) layer and is configured to determine transmission modes to which radio link control (RLC) channels correspond or transmission modes to which logical channels correspond.

For yet another example, the second determining unit 607 is configured in the media access control (MAC) layer and is configured to determine the transmission modes to which the logical channels correspond or the transmission mode to which the PDU corresponds.

In Implementation 1 and Implementation 2, as shown in FIG. 6, the apparatus 600 further includes:

a second transmitting unit 608 configured in a higher layer of the terminal equipment and configured to notify the transmission modes to a lower layer; or a marking unit 609 configured to mark the transmission modes to which the data packets of the V2X services, and/or the QoS flows, and/or the data radio bearers (DRBs), and/or the radio link control (RLC) channels, and/or the logical channels correspond.

In Implementation 1 and Implementation 2, as shown in FIG. 6, the apparatus 600 further includes:

a first notifying unit 610 configured to notify the transmission modes to a network device.

The first notifying unit 610 notifies the transmission modes to the network device via a sidelink UE information radio resource control (RRC) message, or a sidelink buffer status report (BSR), or a scheduling request (SR).

In Implementation 3, as shown in FIG. 6, the apparatus 600 further includes:

a first setting unit 611 configured to set the transmission modes according to indication information used for configuring or indicating the transmission modes; wherein the indication information is provided by a network device of a core network, or a network device of an access network, or is provided by a roadside unit (RSU), or is preconfigured.

The indication information provided by the network device of the core network is used to configure transmission modes to which data packets on a sidelink and/or the QoS flows correspond; the indication information provided by the network device of the access network is used to configure the transmission modes to which the DRBs on the sidelink and/or the RLC channels and/or the logical channels correspond; and the indication information provided by the network device of the access network contains transmission modes to which scheduled sidelink data correspond.

In Implementation 3, the pre-configured indication information is used to configure transmission modes to which data packets on a sidelink and/or the QoS flows and/or the DRBs and/or the RLC channels and/or the logical channels correspond.

In this embodiment, the transmission modes are determined based on QoS characteristics and/or QoS grade indication of to-be-transmitted data, and/or a target terminal equipment to which the data are transmitted, and/or contents of information contained in the data, and/or a geographical location of the terminal equipment.

The QoS characteristics include: priorities of the data, and/or latency of the data, and/or reliabilities of the data, and/or data rates of the data, and/or a communication range of the data; and the contents of information contained in the data include: a road condition, and/or environment, and/or information on an event, or include: a service request, and/or feedback, or group common information.

Reference may be made to the description of corresponding steps in Embodiment 1 for details of the units, which shall not be described herein any further.

According to this embodiment, the media access control layer of the terminal equipment generates at least one PDU in a way that transmission modes to which service data units (SDU) contained in a protocol data unit (PDU) correspond are identical, hence, the PDU is able to correspond to the transmission mode, and a physical layer is facilitated to transmit data in a corresponding transmission mode. And furthermore, in this embodiment, the terminal equipment determines or sets the transmission mode according to the indication information, and the layers of the terminal equipment perform corresponding processing, which are simple in implementation.

Embodiment 4

Embodiment 4 provides an apparatus for transmitting data of vehicle communication (V2X) services, provided in a network device. As a principle of the apparatus for solving problems is similar to that of the method in Embodiment 2, reference may be made to the implementation of the method in Embodiment 2 for implementation of this apparatus, with identical contents being going to be described herein any further.

Figure 7:
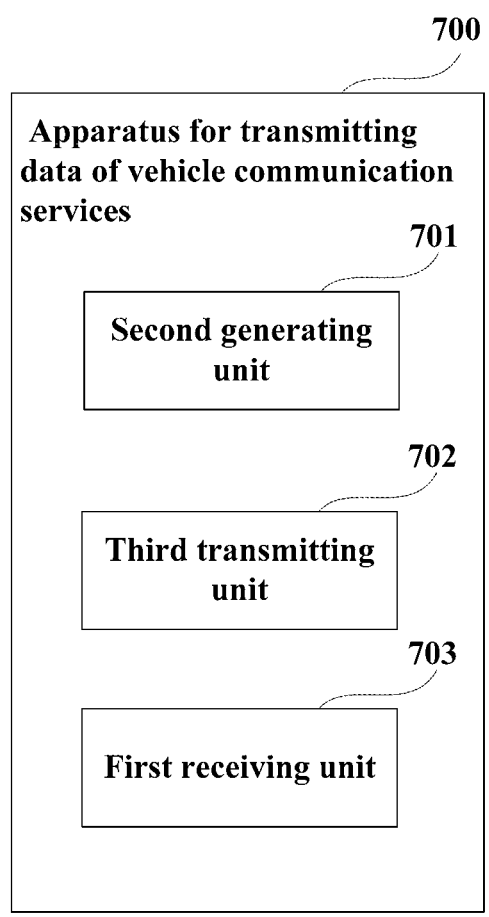
FIG. 7 is a schematic diagram of the apparatus for transmitting data of vehicle communication (V2X) services of Embodiment 4 of this disclosure.

FIG. 7 is a schematic diagram of the apparatus for transmitting data of vehicle communication (V2X) services of Embodiment 4 of this disclosure. As shown in FIG. 7, an apparatus 700 for transmitting data of vehicle communication services includes:

a second generating unit 701 configured to generate indication information used for configuring or indicating transmission modes for transmitting data of a terminal equipment; and a third transmitting unit 702 configured to transmit the indication information to the terminal equipment.

In this embodiment, the network device is a network device of a core network, or a network device of an access network.

In this embodiment, when the network device is a network device of a core network, the indication information is used for configuring transmission modes of which data packets and/or QoS flows on a sidelink.

In this embodiment, when the network device is a network device of an access network, the indication information is used for configuring transmission modes of DRBs on a sidelink and/or RLC channels and/or logical channels.

As shown in FIG. 7, the apparatus 700 may further include:

a first receiving unit 703 configured to receive a notification of a transmission mode of data of a terminal equipment transmitted by the terminal equipment.

In this embodiment, the first receiving unit receives the notification via a sidelink UE information radio resource control (RRC) message, or a sidelink buffer status report (BSR), or a scheduling request (SR).

In this embodiment, in the indication information generated by the second generating unit or in the notification received by the first receiving unit:

the transmission mode may be determined based on QoS characteristics and/or QoS grade indication of to-be-transmitted data, and/or a target terminal equipment to which the data are transmitted, and/or contents of information contained in the data, and/or a geographical location of the terminal equipment.

The QoS characteristics include: priorities of the data, and/or latency of the data, and/or reliabilities of the data, and/or data rates of the data, and/or a communication range of the data.

The contents of information contained in the data include: a road condition, and/or environment, and/or information on an event, or include: a service request, and/or feedback, or group common information.

Furthermore, it should be noted that the apparatus 700 in this embodiment may only include the first receiving unit 703.

Reference may be made to the description of corresponding steps in Embodiment 2 for details of the units, which shall not be described herein any further.

According to this embodiment, the physical layer is facilitated to transmit data in a corresponding transmission mode. And furthermore, suitable transmission modes of unicast, or groupcast, or broadcast may be used according to the characteristics of the data to be transmitted, which is conducive to data transmission satisfying their QoS or being transmitted to a specific destination, while ensuring high radio resource utilization.

Embodiment 5

Embodiment 5 of this disclosure provides a terminal equipment. As a principle of the terminal equipment for solving problems is similar to that of the method in Embodiment 1, reference may be made to the implementation of the method in Embodiment 1 for implementation of this terminal equipment, with identical contents being going to be described herein any further.

Figure 8:
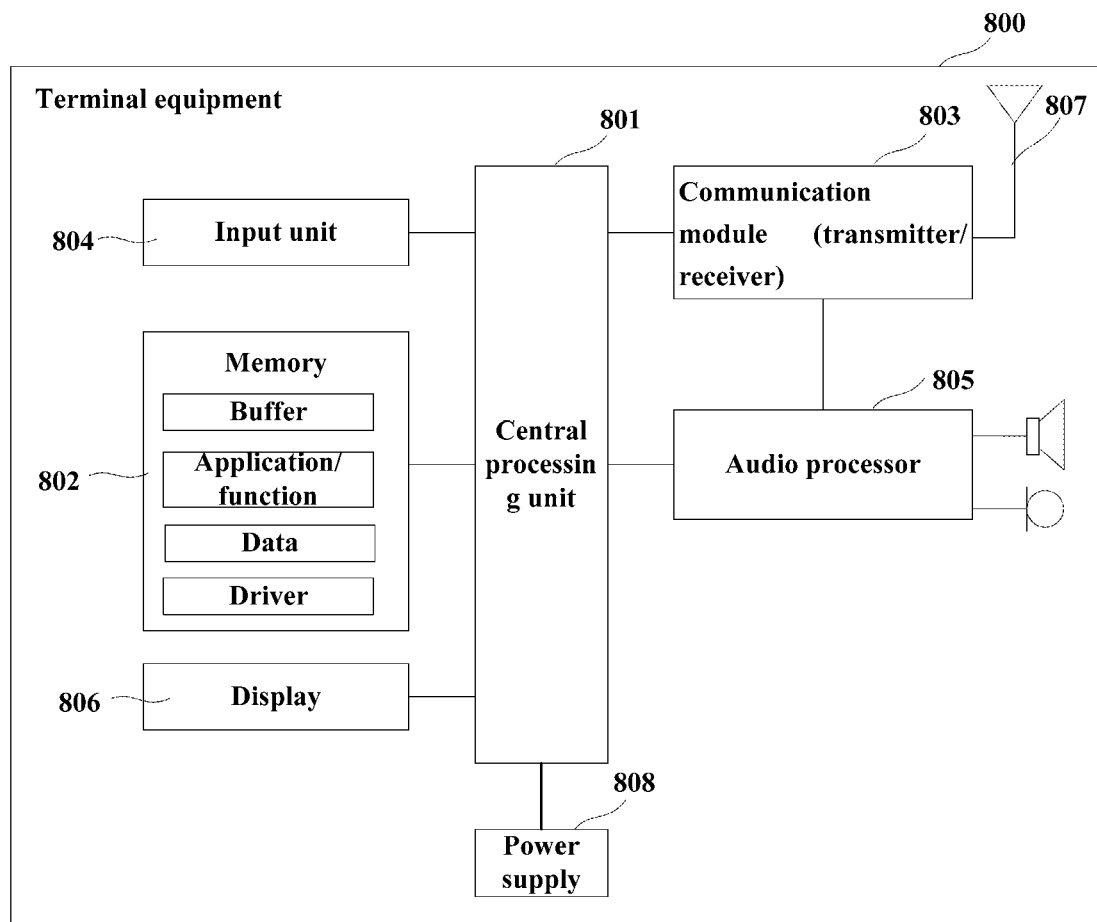
FIG. 8 is a schematic diagram of a structure of the terminal equipment of Embodiment 5 of this disclosure.

FIG. 8 is a schematic diagram of a structure of the terminal equipment of the embodiment of this disclosure. As shown in FIG. 8, a terminal equipment 800 may include a central processing unit (CPU) 801 and a memory 802, the memory 802 being coupled to the central processing unit 801. The memory 802 may store various data, and furthermore, it may store a program for data processing, and execute the program under control of the central processing unit 801, so as to indicate to the terminal equipment according to received signaling. In some examples, as shown in FIG. 8, the terminal equipment 800 may include a communication module 803, an input unit 804, an audio processor 805, a display 806, an antenna 807, and a power supply 808.

In one implementation, the functions of the apparatus 600 in Embodiment 3 may be integrated into the central processing unit 801 of the terminal equipment 800. The central processing unit 801 may be configured to carry out the method for transmitting data of vehicle communication (V2X) services described in Embodiment 1.

For example, the central processing unit 801 may be configured to perform control, such that the terminal equipment 800 carries out the method described in Embodiment 1.

Furthermore, reference may be made to Embodiment 1 for other configuration methods of the central processing unit 801, which shall not be described herein any further.

In another implementation, the apparatus 600 and the central processing unit 801 may be configured separately; for example, the apparatus 600 may be configured as a chip connected to the central processing unit 801, such as units shown in FIG. 8, and the functions of the apparatus 600 are executed under control of the central processing unit 801.

According to this embodiment, the media access control layer of the terminal equipment generates at least one PDU in a way that transmission modes to which service data units (SDU) contained in protocol data units (PDU) correspond are identical, hence, the PDU is able to correspond to the transmission mode, and a physical layer is facilitated to transmit data in a corresponding transmission mode. And furthermore, in this embodiment, the terminal equipment determines or sets the transmission mode according to the indication information, and the layers of the terminal equipment perform corresponding processing, which are simple in implementation.

Embodiment 6

Embodiment 6 of this disclosure provides a network device. As a principle of the network device for solving problems is similar to that of the method in Embodiment 2, reference may be made to the implementation of the method in Embodiment 2 for implementation of this network device, with identical contents being going to be described herein any further.

Figure 9:
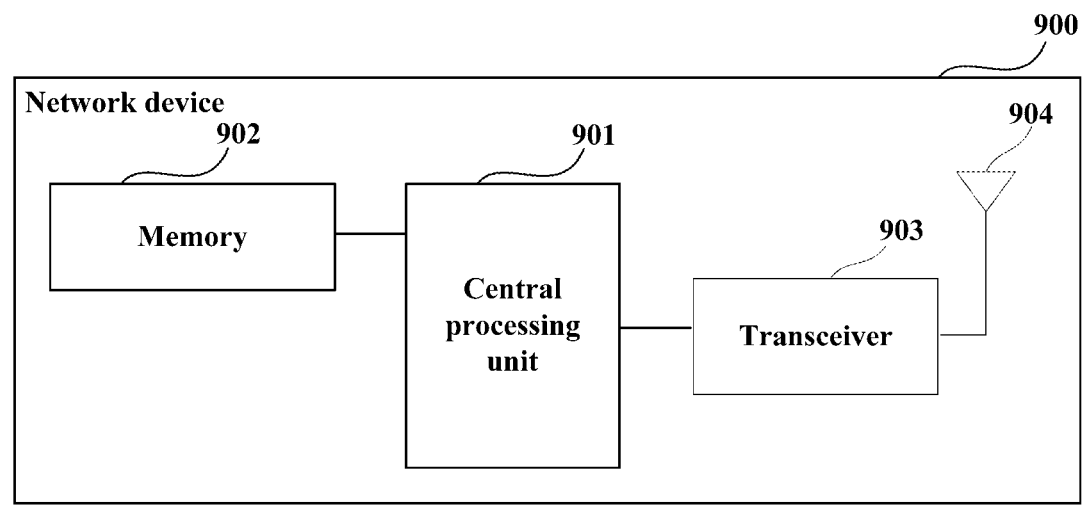
FIG. 9 is a schematic diagram of a structure of the network device of Embodiment 6 of this disclosure.

FIG. 9 is a schematic diagram of a structure of the network device of the embodiment of this disclosure. As shown in FIG. 9, a network device 900 may include a central processing unit (CPU) 901 and a memory 902, the memory 902 being coupled to the central processing unit 901. The memory 902 may store various data, and furthermore, it may store a program for data processing, and execute the program under control of the central processing unit 901.

In one implementation, the functions of the apparatus 700 may be integrated into the central processing unit 901. The central processing unit 901 may be configured to carry out the method described in Embodiment 2.

For example, the central processing unit 901 may be configured to perform control, such that the network device 900 carries out the method described in Embodiment 2.

Furthermore, reference may be made to Embodiment 2 for other configuration methods of the central processing unit 901, which shall not be described herein any further.

In another implementation, the apparatus 700 and the central processing unit 901 may be configured separately; for example, the apparatus 700 may be configured as a chip connected to the central processing unit 901, such as units shown in FIG. 9, and the functions of the apparatus 700 are executed under control of the central processing unit 901.

Furthermore, as shown in FIG. 9, the network device 900 may include a transceiver 903, and an antenna 904, etc. Functions of the above components are similar to those in the related art, and shall not be described herein any further. It should be noted that the network device 900 does not necessarily include all the parts shown in FIG. 9. Furthermore, the network device 900 may include parts not shown in FIG. 9, and the related art may be referred to.

According to this embodiment, the physical layer is facilitated to transmit data in a corresponding transmission mode. And furthermore, suitable transmission modes of unicast, or groupcast, or broadcast may be used according to the characteristics of the data to be transmitted, which is conducive to data transmission satisfying their QoS or being transmitted to a specific destination, while ensuring high radio resource utilization.

Embodiment 7

Embodiment 7 of this disclosure provides a communication system, including at least the terminal equipment 800 in Embodiment 5 and the network device 900 in Embodiment 6. Contents of Embodiment 5 and Embodiment 6 are incorporated herein, and shall not be described herein any further.

According to this embodiment, the media access control layer of the terminal equipment generates at least one PDU in a way that transmission modes to which service data units (SDU) contained in protocol data units (PDU) correspond are identical, hence, the PDU is able to correspond to the transmission mode, and a physical layer is facilitated to transmit data in a corresponding transmission mode. And furthermore, in this embodiment, the terminal equipment determines or sets the transmission mode according to the indication information, and the layers of the terminal equipment perform corresponding processing, which are simple in implementation.

An embodiment of this disclosure provides a computer storage medium, including a computer readable program code, which will cause an apparatus for transmitting data of vehicle communication (V2X) services or a terminal equipment to carry out the method for transmitting data of vehicle communication (V2X) services described in Embodiment 1.

An embodiment of the present disclosure provides a computer readable program code, which, when executed in an apparatus for transmitting data of vehicle communication (V2X) services or a terminal equipment, will cause the apparatus for transmitting data of vehicle communication (V2X) services or the terminal equipment to carry out the method for transmitting data of vehicle communication (V2X) services described in Embodiment 1.

An embodiment of this disclosure provides a computer storage medium, including a computer readable program code, which will cause an apparatus for transmitting data of vehicle communication (V2X) services or a network device to carry out the method for transmitting data of vehicle communication (V2X) services described in Embodiment 2.

An embodiment of the present disclosure provides a computer readable program code, which, when executed in an apparatus for transmitting data of vehicle communication (V2X) services or a network device, will cause the apparatus for transmitting data of vehicle communication (V2X) services or the network device to carry out the method for transmitting data of vehicle communication (V2X) services described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods carried out in the apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 5 and 6 may either correspond to software modules of procedures of a computer program, or correspond to hardware modules. Such software modules may respectively correspond to the steps shown in FIGS. 2 and 4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 5 and 6 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 5 and 6 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further provided in this disclosure.

1. An apparatus for transmitting data of vehicle communication (V2X) services, configured in a terminal equipment, the apparatus including:
 a first generating unit configured in a media access control (MAC) layer of the terminal equipment and configured to generate at least one protocol data unit (PDU) in a way that transmission modes to which service data units (SDU) contained in a PDU correspond are identical; and
 a first transmitting unit configured in the MAC layer and configured to transmit the PDU to a physical layer of the terminal equipment, and notify the transmission mode to which the PDU corresponds to the physical layer.

2. The apparatus according to supplement 1, wherein, the transmission mode includes unicast, or groupcast, or broadcast.

3. The apparatus according to supplement 1, wherein the apparatus further includes:
a first determining unit configured in an upper layer of the terminal equipment and configured to determine the transmission mode.

4. The apparatus according to supplement 3, wherein, the first determining unit indicates data packets of the V2X services and a transmission mode to which the data packets of the V2X services correspond.

5. The apparatus according to supplement 4, wherein the apparatus further includes:
a first mapping unit configured in a packet filter of the terminal equipment and configured to map the data packets onto quality of service (QoS) flows; and wherein transmission modes to which data packets in a QoS flow correspond are identical.

6. The apparatus according to supplement 4, wherein the apparatus further includes:
a second mapping unit configured in a service data adaptation protocol (SDAP) layer of the terminal equipment and configured to map the QoS flows or the data packets of the V2X services onto data radio bearers (DRBs); wherein transmission modes to which QoS flows or data packets of the V2X services on a DRB correspond are identical.

7. The apparatus according to supplement 4, wherein the apparatus further includes:
a third mapping unit configured in a packet data convergence protocol (PDCP) layer of the terminal equipment and configured to map the QoS flows or the data packets of the V2X services onto data radio bearers (DRBs); wherein transmission modes to which QoS flows or data packets of the V2X services on a DRB correspond are identical.

8. The apparatus according to supplement 3, wherein, the packet filter of the terminal equipment maps the data packets onto the quality of service (QoS) flows; and wherein transmission modes to which data packets in a QoS flow correspond are identical;
and the first determining unit is configured in the packet filter, and a transmission mode to which the QoS flows correspond is determined by the first determining unit.

9. The apparatus according to supplement 1, wherein the apparatus further includes:
a second determining unit configured in an access stratum of the terminal equipment and configured to determine the transmission mode.

10. The apparatus according to supplement 9, wherein, the second determining unit is configured in the service data adaptation protocol (SDAP) layer, or the packet data convergence protocol (PDCP) layer, or a radio link control (RLC) layer, or the media access control (MAC) layer, of the terminal equipment, and configured to determine the transmission mode.

11. The apparatus according to supplement 10, wherein, the second determining unit is configured in the service data adaptation protocol (SDAP) layer, and the second determining unit determines the transmission modes to which the QoS flows or data packets of the V2X services correspond, and the service data adaptation protocol (SDAP) layer maps the QoS flows or data packets of the V2X services onto data radio bearers (DRBs); wherein transmission modes to which QoS flows or data packets of the V2X services on a DRB correspond are identical; or
the service data adaptation protocol (SDAP) layer maps the QoS flows or data packets of the V2X services onto data radio bearers (DRBs), and the second determining unit determines transmission modes to which the DRBs correspond.

12. The apparatus according to supplement 10, wherein, the second determining unit is configured in the packet data convergence protocol (PDCP) layer and configured to determine the transmission modes to which the DRBs correspond, or transmission modes to which radio link control (RLC) channels correspond, or transmission modes to which logical channels correspond, the DRBs corresponding to the RLC channels and the logical channels.

13. The apparatus according to supplement 10, wherein, the second determining unit is configured in the radio link control (RLC) layer and is configured to determine transmission modes to which radio link control (RLC) channels correspond or transmission modes to which logical channels correspond.

14. The apparatus according to supplement 10, wherein, the second determining unit is configured in the media access control (MAC) layer and is configured to determine the transmission modes to which the logical channels correspond or the transmission mode to which the PDU corresponds.

15. The apparatus according to supplements 3-14, wherein the apparatus further includes:
a second transmitting unit configured in a higher layer of the terminal equipment and configured to notify the transmission modes to a lower layer; or
a marking unit configured to mark the transmission modes to which the data packets of the V2X services, and/or the QoS flows, and/or the data radio bearers (DRBs), and/or the radio link control (RLC) channels, and/or the logical channels correspond.

16. The apparatus according to any one of supplements 3-15, wherein the apparatus further includes:
a first notifying unit configured to notify the transmission modes to a network device.

17. The apparatus according to supplement 16, wherein, the first notifying unit notifies the transmission modes to the network device via a sidelink UE information radio resource control (RRC) message, or a sidelink buffer status report (BSR), or a scheduling request (SR).

18. The apparatus according to supplement 1, wherein the apparatus further includes:
a first setting unit configured to set the transmission modes according to indication information used for configuring or indicating the transmission modes;
and wherein the indication information is provided by a network device of a core network, or a network device of an access network, or is provided by a roadside unit (RSU), or is preconfigured.

19. The apparatus according to supplement 18, wherein, the indication information provided by the network device of the core network is used to configure transmission modes to which data packets on a sidelink and/or the QoS flows correspond.

20. The apparatus according to supplement 18, wherein, the indication information provided by the network device of the access network is used to configure the transmission modes to which the DRBs on the sidelink and/or the RLC channels and/or the logical channels correspond.

21. The apparatus according to supplement 18, wherein, the indication information provided by the network device of the access network contains transmission modes to which scheduled sidelink data correspond.

22. The apparatus according to supplement 18, wherein, the pre-configured indication information is used to configure transmission modes to which data packets on a sidelink and/or the QoS flows and/or the DRBs and/or the RLC channels and/or the logical channels correspond.

23. The apparatus according to any one of supplements 1-22, wherein,
the transmission modes are determined based on QoS characteristics and/or QoS grade indication of to-be-transmitted data, and/or a target terminal equipment to which the data are transmitted, and/or contents of information contained in the data, and/or a geographical location of the terminal equipment.

24. The apparatus according to supplement 23, wherein, the QoS characteristics include: priorities of the data, and/or latency of the data, and/or reliabilities of the data, and/or data rates of the data, and/or a communication range of the data;
and the contents of information contained in the data include: a road condition, and/or environment, and/or information on an event, or include: a service request, and/or feedback, or group common information.

25. An apparatus for transmitting data of vehicle communication (V2X) services, configured in a network device, the apparatus including:
a second generating unit configured to generate indication information used for configuring or indicating transmission modes for transmitting data of a terminal equipment; and
a third transmitting unit configured to transmit the indication information to the terminal equipment;
wherein the network device is a network device of a core network, or a network device of an access network.

26. The apparatus according to supplement 25, wherein, when the network device is a network device of a core network, the indication information is used for configuring transmission modes to which data packets and/or QoS flows on a sidelink correspond.

27. The apparatus according to supplement 25, wherein, when the network device is a network device of an access network, the indication information is used for configuring transmission modes of DRBs on a sidelink and/or RLC channels and/or logical channels.

28. The apparatus according to supplement 25, wherein, when the network device is a network device of a core network, the indication information contains transmission modes to which scheduled sidelink data correspond.

29. An apparatus for determining a transmission mode of data in vehicle communication (V2X) services, including:
a first receiving unit configured to receive a notification of a transmission mode of data of a terminal equipment transmitted by the terminal equipment.

30. The apparatus according to supplement 29, wherein, the first receiving unit receives the notification via a sidelink UE information radio resource control (RRC) message, or a sidelink buffer status report (BSR), or a scheduling request (SR).

31. The apparatus according to any one of supplements 25-30, wherein,
in the indication information generated by the second generating unit, or in the notification receive by the first receiving unit,
the transmission mode is determined based on QoS characteristics and/or QoS grade indication of to-be-transmitted data, and/or a target terminal equipment to which the data are transmitted, and/or contents of information contained in the data, and/or a geographical location of the terminal equipment.

32. The apparatus according to supplement 31, wherein, the QoS characteristics include: priorities of the data, and/or latency of the data, and/or reliabilities of the data, and/or data rates of the data, and/or a communication range of the data;
and the contents of information contained in the data include: a road condition, and/or environment, and/or information on an event, or include: a service request, and/or feedback, or group common information.

33. A communication system, including a network device and a terminal equipment;
wherein the network device includes the apparatus as described in any one of supplements 25-32, and the terminal equipment includes the apparatus as described in any one of supplements 1-24.

34. A communication system, comprising a network device and a terminal equipment;
wherein the network device comprises an apparatus for transmitting data of vehicle communication (V2X) services, configured in the network device, the apparatus comprising:
processor circuitry configured to generate indication information used for configuring or indicating transmission modes for transmitting data of a terminal equipment; and
transmitter circuitry configured to transmit the indication information to the terminal equipment;
wherein the network device is a network device of a core network, or a network device of an access network; and
the terminal equipment comprises an apparatus for transmitting data of V2X services, configured in the terminal equipment, the apparatus comprising:
processor circuitry configured in a media access control (MAC) layer of the terminal equipment and configured to generate at least one protocol data unit (PDU) in a way that transmission modes to which service data units (SDU) contained in a PDU correspond are identical; and
transmitter circuitry configured in the MAC layer and configured to transmit the PDU to a physical layer of the terminal equipment, and notify the transmission mode to which the PDU corresponds to the physical layer.

What is claimed is:
1. An apparatus for performing sidelink communication, configured in a terminal equipment, the apparatus comprising:
a receiver configured to receive indication information from a network device via radio resource control (RRC) signaling, the indication information being used, by the terminal equipment, to configure a transmission mode for a sidelink Radio Bearer; and
processor circuitry configured to:
generate, in a media access control (MAC) layer, at least one protocol data unit (PDU) in a way that transmission modes to which service data units (SDUs) contained in a PDU correspond are identical;

send the PDU from the MAC layer to a physical layer of the terminal equipment, and notify, in information separate from the PDU, the transmission mode to which the PDU corresponds to the physical layer; and set, according to the indication information, the transmission mode for the sidelink Radio Bearer in a Service Data Adaptation Protocol (SDAP) layer by the terminal equipment.

2. The apparatus according to claim 1, wherein the transmission mode comprises unicast, or groupcast, or broadcast.

3. The apparatus according to claim 1, wherein the processor circuitry notifies the transmission modes to the a network device.

4. The apparatus according to claim 3, wherein the processor circuitry notifies the transmission modes to the network device via a sidelink UE information radio resource control (RRC) message, or a sidelink buffer status report (BSR), or a scheduling request (SR).

5. The apparatus according to claim 1, wherein the indication information provided by the network device of a core network is used to configure transmission modes which data packets on a sidelink or the Qos flows correspond to.

6. The apparatus according to claim 1, wherein the indication information provided by the network device of an access network is used to configure transmission modes which radio link control (RLC) channels or logical channels correspond to.

7. The apparatus according to claim 1, wherein the indication information provided by the network device of an access network contains transmission modes to which scheduled sidelink data correspond.

8. An apparatus for controlling sidelink communication that is performed by a terminal, configured in a network device, the apparatus comprising:

processor circuitry configured to generate indication information used for configuring or indicating transmission modes for transmitting data of the terminal, wherein the transmission modes comprise unicast, groupcast, or broadcast; and a transmitter configured to transmit the indication information to the terminal via radio resource control (RRC) signaling, and the indication information is used, by the terminal, to configure the transmission mode for a sidelink Radio Bearer, wherein the processor circuitry causes the terminal, by transmitting the indication information, to send PDU that is generated by the terminal from a media access control (MAC) layer to a physical layer, and to notify, in information separate from the PDU, the transmission mode to which the PDU corresponds to the physical layer, and to set, according to the indication information, the transmission mode for the sidelink Radio Bearer in a Service Data Adaptation Protocol (SDAP) layer by the terminal.

9. The apparatus according to claim 8, wherein the indication information is used to configure the transmission mode for a sidelink DRB.

10. A communication system, comprising:

a network device for performing sidelink communication; and a terminal equipment for performing the sidelink communication, wherein the network device comprises:

first processor circuitry configured to:

generate indication information used for indicating transmission modes for transmitting data of the terminal equipment on a sidelink, wherein the transmission modes comprise unicast, groupcast, or broadcast; and transmit the indication information to the terminal equipment from the network device via radio resource control (RRC) signaling, and the indication information is used, by the terminal equipment, to configure the transmission mode for a sidelink Radio Bearer; and the terminal equipment comprises:

a receiver configured to receive the indication information indicating the transmission mode from the network device; and second processor circuitry configured to:

generate, in a media access control (MAC) layer of the terminal equipment, at least one protocol data unit (PDU) in a way that transmission modes to which service data units (SDUs) contained in a PDU correspond are identical; and send the PDU from the MAC layer to a physical layer of the terminal equipment, and notify, in information separate from the PDU, the transmission mode to which the PDU corresponds to the physical layer; and set, according to the indication information, the transmission mode for the sidelink Radio Bearer in a Service Data Adaptation Protocol (SDAP) layer by the terminal equipment.

* * * * *